W. M. MYERS.
SOAP DISH.
APPLICATION FILED JULY 20, 1911.
1,167,710.
Patented Jan. 11, 1916.
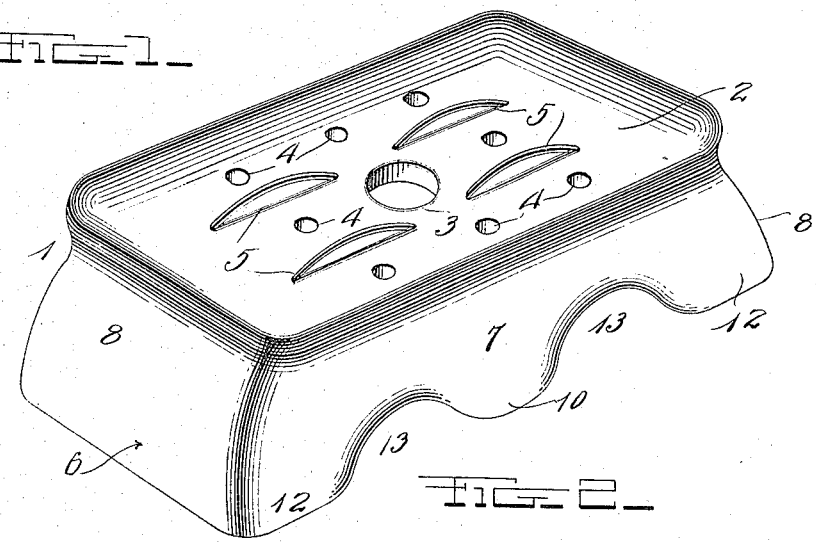
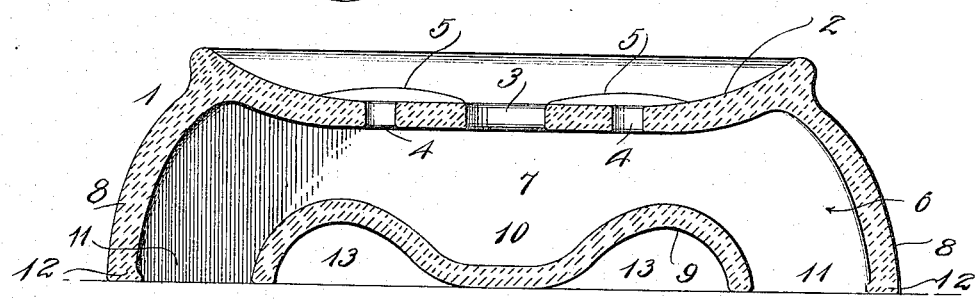
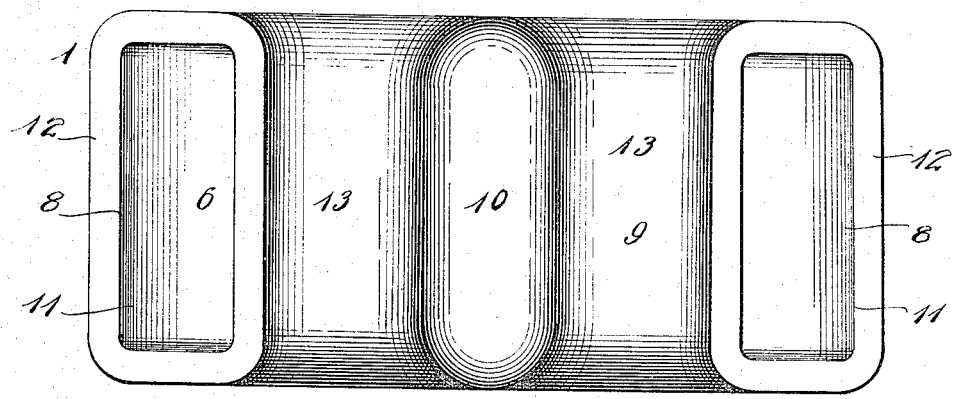
Witnesses
J. R. Pierce
C. E. Hunt
Inventor
W. M. Myers
by H. B. Willson & Co.
Attorneys

UNITED STATES PATENT OFFICE.

WILLIAM M. MYERS, OF HANNIBAL, MISSOURI.

SOAP-DISH.

1,167,710.  Specification of Letters Patent.  Patented Jan. 11, 1916.

Application filed July 20, 1911. Serial No. 639,608.

*To all whom it may concern:*

Be it known that I, WILLIAM M. MYERS, a citizen of the United States, residing at Hannibal, in the county of Marion and State of Missouri, have invented certain new and useful Improvements in Soap-Dishes; and I do declare the following to be a full, clear, and exact description of the invention, such as will enable others skilled in the art to which it appertains to make and use the same.

This invention relates to improvements in soap dishes.

One object of the invention is to provide a soap dish comprising a perforated soap receiving tray and a drip receptacle formed in one piece.

Another object is to provide a soap dish of this character having means whereby the drippings may be readily removed from the bottom of the dish and the latter thus thoroughly cleansed.

With these and other objects in view the invention consists of certain novel features of construction, combination and the arrangements of parts as will be more fully described and afterward specifically claimed.

In the accompanying drawings: Figure 1 is a perspective view of a soap dish constructed in accordance with the invention; Fig. 2 is a vertical longitudinal sectional view; Fig. 3 is a bottom plan view of the same.

Referring more particularly to the drawings 1 denotes my improved soap dish which may be of any desired size and formed of any suitable material. The dish 1 has its upper surface depressed to form a soap receiving tray 2 in which is formed a large central drip opening 3 and a series of smaller drip openings 4. On the bottom of the tray are also formed a series of upwardly projecting ribs 5 which support the cake of soap above the bottom of the tray. As clearly shown in Fig. 1 the upper soap supporting edges or surface of the ribs 5 are curved and arranged in parallel relation to one another, whereby a cake of soap is properly supported above the openings in the soap receiving tray.

Formed integral with the tray 2 is a hollow base portion 6 comprising sides 7, outwardly curved or bulging ends 8, and a bottom 9. The central portion of the bottom 9 is depressed to form below the drip openings of the tray a drip receptacle 10, the bottom of the lower surface of said depressed portion extending down a sufficient distance to engage the surface upon which the dish rests, thereby forming a central support for the dish. The ends of the bottom 9 after forming the depression 10 curve downwardly and terminate some distance from the lower edges of the ends 8 of the dish, thereby forming discharge openings 11 through which the drippings from the receptacle formed by the depression 10 are removed and through which the receptacle may be thoroughly cleansed. The downwardly curved ends of the bottom and the ends 8 of the dish together with the adjacent portions of the sides 7 form end supporting members 12 between which and the depressed portion 10 forming the central support are air spaces 13 through which air may freely circulate, thus keeping the space between the dish and the support on which the same rests in a dry, sanitary condition.

By forming the dish as herein shown and described it will be seen that the waste or drip water from the tray may be readily removed from the drip receptacle 10 through either of the discharge openings 11 at the ends of the dish which greatly facilitates the cleaning of the tray and obviates the necessity of removing the waste water through the drip openings in the soap receiving tray of the dish. My improved soap dish may be easily and inexpensively constructed in one piece from porcelain, glass, earthenware or similar material.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim:

1. A soap dish comprising a perforated receiving tray, a hollow base depressed midway its ends, the ends of said depressed portion curving downwardly and terminating some distance from the ends of the dish forming discharge openings.

2. A soap dish comprising a perforated soap receiving tray an integrally formed hollow base portion having in the bottom thereof a centrally disposed depression forming a drip receptacle, said bottom terminating short of the ends of the base thereby forming discharge openings through which the waste water and drippings caught by the receptacle are removed.

3. A soap dish comprising a perforated soap receiving tray, an integrally formed hollow base portion having outwardly bulged ends, the bottom of said base portion being depressed midway between said ends to form a centrally disposed drip receptacle, and a central support for the dish, the ends of said depressed portion curving downwardly and terminating some distance from the ends of the dish, thereby forming discharge openings through which the waste water and drippings may be removed from the drip receptacle, said downwardly extending ends of the drip receptacle portion of the bottom providing ventilating spaces between themselves and the depressed central portion of the base.

In testimony whereof I have hereunto set my hand in presence of two subscribing witnesses.

WILLIAM M. MYERS.

Witnesses:
T. E. BATES,
FREDERICK D. WILKINS.

Copies of this patent may be obtained for five cents each, by addressing the "Commissioner of Patents, Washington, D. C."